(12) United States Patent
Wuschek et al.

(10) Patent No.: US 9,213,528 B2
(45) Date of Patent: Dec. 15, 2015

(54) DIALOG GENERATION

(75) Inventors: Michael Wuschek, Rauenberg (DE); Kay Hammerl, St. Leon-Rot (DE); Berthold Wocher, Gaiberg (DE)

(73) Assignee: SAP SE, Walldorf (DE)

( * ) Notice: Subject to any disclaimer, the term of this patent is extended or adjusted under 35 U.S.C. 154(b) by 1285 days.

(21) Appl. No.: 12/944,094

(22) Filed: Nov. 11, 2010

(65) Prior Publication Data

US 2012/0124545 A1  May 17, 2012

(51) Int. Cl.
*G06F 9/44* (2006.01)

(52) U.S. Cl.
CPC .. *G06F 8/34* (2013.01); *G06F 8/20* (2013.01); *G06F 8/30* (2013.01); *G06F 8/35* (2013.01); *G06F 8/36* (2013.01); *G06F 8/38* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,662,401 | A * | 5/1972 | Collins et al. | 718/103 |
| 5,327,529 | A * | 7/1994 | Fults et al. | 715/762 |
| 5,414,847 | A * | 5/1995 | Tsukakoshi | 717/104 |
| 5,767,852 | A * | 6/1998 | Keller et al. | 715/835 |
| 5,960,410 | A * | 9/1999 | Halpern | 705/21 |
| 6,621,505 | B1 * | 9/2003 | Beauchamp et al. | 715/764 |
| 6,915,486 | B2 * | 7/2005 | Li et al. | 715/765 |
| 7,716,630 | B2 | 5/2010 | Wholey et al. | |
| 7,793,258 | B2 * | 9/2010 | Sundararajan et al. | 717/109 |
| 7,941,438 | B2 * | 5/2011 | Molina-Moreno et al. | 707/756 |
| 8,015,541 | B1 * | 9/2011 | Srinivasan et al. | 717/104 |
| 8,112,457 | B2 * | 2/2012 | Berry et al. | 707/805 |
| 2002/0063734 | A1 * | 5/2002 | Khalfay et al. | 345/744 |
| 2005/0203764 | A1 * | 9/2005 | Sundararajan et al. | 705/1 |
| 2006/0005124 | A1 * | 1/2006 | Speicher | 715/514 |
| 2008/0046834 | A1 * | 2/2008 | Yu et al. | 715/771 |
| 2008/0275910 | A1 * | 11/2008 | Molina-Moreno et al. | 707/103 R |
| 2009/0125796 | A1 * | 5/2009 | Day et al. | 715/219 |

OTHER PUBLICATIONS

Angel Puerta, Michael Micheletti, and Alan Mak. "The UI Pilot: A Model-Based Tool to Guide Early Interface Design". Proceedings of the 10th International Conference on Intelligent User Interfaces. Jan. 10-13, 2005. San Diego, California, USA.*

Vanderdonckt, Jean. "A MDA-Compliant Environment for Developing User Interfaces of Information Systems". Advanced Information Systems Engineering. Lecture Notes in Computer Science vol. 3520, 2005, pp. 16-31.*

(Continued)

*Primary Examiner* — Jason Mitchell
*Assistant Examiner* — Mark Gooray
(74) *Attorney, Agent, or Firm* — Fish & Richardson P.C.

(57) ABSTRACT

In one aspect, a method of generating a computer-based dialog process includes receiving, in a computer system, a process type for creating a process. The process type includes (i) step elements each corresponding to a user-interaction task in the process, and (ii) step groups each including one or more of the step elements, wherein the process type defines an order of the step groups. The method includes receiving executable code for the process in a configuration-time context. The executable code (i) specifies that each of the step groups is performed in one or more steps, thereby defining a granularity of the process, and (ii) assigns at least one of the step elements in each step group to each of the one or more steps, thereby defining an order of the step elements in each step group. The method includes generating a runtime implementation of the process using the executable code.

16 Claims, 7 Drawing Sheets

(56) References Cited

OTHER PUBLICATIONS

Kênia Sousa, Hildeberto Mendonça, Jean Vanderdonckt, Els Rogier, and Joannes Vandermeulen. User Interface Derivation from Business Processes: A Model-Driven Approach for Organizational Engineering. Proceedings of the 2008 ACM symposium on Applied Computing. Mar. 16-20, 2008. Fortaleza, Ceara, Brazil.*

Foster, Mark, "Java CAPS 6 Tutorial, Creating Re-Usable Business Services in Java CAPS 6", Sun Microsystems, Inc., Jun. 1, 2008, 17 pages.

Knapp, Alexander et al., *Modeling Business Process in Web Applications with ArgoUWE*\*, The Unified Modeling Language. Modeling Languages and Applications, 7$^{th}$ International Conference, Oct. 2004.

Fu, Yujian et al., *An Approach to Web Services Oriented Modeling and Validation*, 28$^{th}$ International Conference on Software Engineering, May 2006, pp. 81-87.

\* cited by examiner

| Home | Applications | Content Management | Configurations | Templates |

Module Details

Applications > phstore_crm_miwu > phstore > com.co.checkout.processconfig

[Edit]

com.co.checkout.processconfig  } 404
Checkout Process Configuration

Namespace: co  Modified On: 02/02/2010
Added On: 01/01/2010  Modified By: WCBADMIN
Added By: WCBADMIN

⌐ 402

| Settings | Validation |

Select Process Type: | Sales ▼ | ⌐ 418

| | ID | Title | Description | Process Determination Class |
|---|---|---|---|---|
| ☐ | saleswithoutgiftc... | ...on Giftcard Sales | Standard sale without gift card | com.co.checkout.ui.procnog |
| ☐ | sales | ...hy Sale *414* | Standard sales process | com.co.checkout.ui.procsale |
| ☐ | saleswithgiftcard *406* | ...iftcard Sales | Sales process with gift card *416* | com.co.checkout.ui.procwgift |
| ☐ | giftcardonly | Giftcard Only Sale | Sales with only a gift card *416* | com.co.checkout.ui.procgift *412* |

Default
Sales
Quotation
Order Template
Telco | true *408* 25 *410*

| Home | Applications | Content Management | Configurations | Templates |

Module Details

Applications > phstore_crm_miwu > phstore > com.co.checkout.processconfig

[Save] [Cancel]

com.co.checkout.processconfig
Checkout Process Configuration

Namespace: co
Added On: 01/01/2010    Modified On: 02/02/2010
Added By: WCBADMIN    Modified By: WCBADMIN

⌐502

| Settings | Validation |

Select Process Type: Sales

[New Step] [Edit] [Move Up] [Move Down]

| | Step Group Assignment | ID _506_ | Description | UI Title _508_ | Actions _510_ | _512_ |
|---|---|---|---|---|---|---|
| ☐ ▲ | SG_LOGIN | S_PD01 | Receive Personal Data | Log In | Remove | Add Validator |
| ☐ ▲ | SG_DETAILS _504_ | S_SD01 | Enter Shipping Data | Shipping | Remove | Add Validator |
| ☐ ▲ | SG_DETAILS | S_PAY01 | Enter Billing Address | Billing Address | Remove | Add Validator |
| ☐ ▼ | SG_PLACE_ORDER | S_PO01 | View and Finalize Order | Place Order | Remove | Add Validator |
| _514_ ☐ | Disable Prereqs | S_PO01 | Show the order details to the... | Order Summary | Remove | Details |

DIALOG GENERATION

TECHNICAL FIELD

This document relates to generating user interface dialogs.

BACKGROUND

Enterprise software can manage, record, and facilitate transactions in an enterprise system. Components of enterprise software can be distributed across hardware devices and/or virtual environments, as well as across geographic locations. Some enterprise software is designed for reuse, and contains components that are designed to meet general business needs.

One or more devices in a system can be involved in gathering, generating, processing, and storing transactional information. For example, sales documentation, customer files and accounting records of an organization are handled at least in part by one or more applications.

A dialog is a type of graphical user interface, such as a box or other window, that can be used for reciprocal communication or "dialog" between a computer and a user. A dialog can present information to a user or request data entry by the user, or both. One or more buttons in a dialog can be configured so that they launch a command upon activation, such as "save," "submit," or "cancel."

SUMMARY

In one aspect, a method of generating a computer-based dialog process includes receiving, in a computer system, a process type for creating a process. The process type includes (i) step elements each corresponding to a user-interaction task in the process, and (ii) step groups each including one or more of the step elements, wherein the process type defines an order of the step groups. The method includes receiving executable code for the process in a configuration-time context. The executable code (i) specifies that each of the step groups is performed in one or more steps, thereby defining a granularity of the process, and (ii) assigns at least one of the step elements in each step group to each of the one or more steps, thereby defining an order of the step elements in each step group. The method includes generating a runtime implementation of the process using the executable code.

Implementations can include any, all, or none of the following features. The method includes receiving, in the configuration-time context, binding information associated with another process, the binding information defining criteria for using the other process in place of the process in a runtime context. At least a first step element has a step element prerequisite applying to the step where the first step element is included or to an earlier step in the process. The step element prerequisite is configured to be used in any of an optional mode or a mandatory mode, according to user selection received in the configuration-time context. At least one step element is associated with a step element validator to validate the state of the step element in the runtime implementation.

In a second aspect, a computer program product is tangibly embodied in a computer readable storage medium. The computer program product includes instructions that when executed by a processor generate a graphical user interface includes a process selection area presenting an identifier of a generic process flow to a user, the process type for creating a process. The process type including (i) step elements each corresponding to a user-interaction task in the process, and (ii) step groups each including one or more of the step elements, wherein the process type defines an order of the step groups. The graphical user interface includes a first input control for receiving a selection by the user which (i) specifies that each of the step groups is performed one or more steps, thereby defining a granularity of the process, and (ii) assigns at least one of the step elements in each step group to each of the one or more steps, thereby defining an order of the step elements in each step group. The graphical user interface includes a second input control for storing a runtime implementation of the process using the executable code.

Implementations can include any, all, or none of the following features. A third input control for receiving, in the configuration-time context, another user input including binding information associated with another process, the binding information defining criteria for using the other process in place of the process in a runtime context. At least a first step element has a step element prerequisite applying to the step where the first step element is included or to an earlier step in the process. A fourth input control for configuring the step element prerequisite to be used in any of an optional mode or a mandatory mode. At least one step element is associated with a step element validator to validate the state of the step element in the runtime implementation.

In a third aspect, a computer program product tangibly embodied in a computer-readable storage medium and comprising instructions that when executed by a processor perform a method of generating a computer-based dialog process. The method includes receiving, in a computer system, a process type for creating a process. The process type includes (i) step elements each corresponding to a user-interaction task in the process, and (ii) step groups each including one or more of the step elements, wherein the process type defines an order of the step groups. The method includes receiving executable code for the process in a configuration-time context. The executable code (i) specifies that each of the step groups is performed in one or more steps, thereby defining a granularity of the process, and (ii) assigns at least one of the step elements in each step group to each of the one or more steps, thereby defining an order of the step elements in each step group. The method includes generating a runtime implementation of the process using the executable code.

Implementations can include any, all, or none of the following features. The method includes receiving, in the configuration-time context, binding information associated with another process, the binding information defining criteria for using the other process in place of the process in a runtime context. At least a first step element has a step element prerequisite applying to the step where the first step element is included or to an earlier step in the process. The step element prerequisite is configured to be used in any of an optional mode or a mandatory mode, according to user selection received in the configuration-time context. At least one step element is associated with a step element validator to validate the state of the step element in the runtime implementation.

In a fourth aspect, a system includes a design-time module for creating a process type for creating a process. The process type includes (i) step elements each corresponding to a user-interaction task in the process, and (ii) step groups each including one or more of the step elements, wherein the process type defines an order of the step groups. The system includes a configuration-time context module for creating executable code for the process in a configuration-time context. The executable code (i) specifies that each of the step groups is performed in one or more steps, thereby defining a granularity of the process, and (ii) assigns at least one of the step elements in each step group to each of the one or more steps, thereby defining an order of the step elements in each step group. The system includes a runtime context module for generating a runtime implementation of the process using the executable code.

Implementations can include any, all, or none of the following features. The configuration time context module creates binding information associated with another process, the binding information defining criteria for using the other process in place of the process in a runtime context module. At least a first step element has a step element prerequisite applying to the step where the first step element is included or to an earlier step in the process. The step element prerequisite is configured to be used in any of an optional mode or a mandatory mode, according to user selection received in the configuration-time context. At least one step element is associated with a step element validator to validate the state of the step element in the runtime implementation.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In some examples described herein, an interface dialog for a process can be created in part by defining a step groups comprising step elements. In some implementations, the dialog is to be included in a checkout process for an online transaction. A process type for the dialog can be designed which can contain reusable components generally related to a type of business function. The process type can contain step groups representing general user interface tasks. Specific user interface tasks can be represented by step elements. When a system is being configured to perform the process, the step elements can be freely organized into one or more steps within the corresponding step group. This can allow a degree of flexibility in the specifics of the interface dialog, while preserving an overall structure defined by the step groups in the process type.

Various implementations of the subject matter described here may provide one or more of the following advantages. In one or more implementations, designing process types, step groups, and step elements may result in software objects that can be reused for similar business process. In one or more implementations, organizing step elements in step groups, and the step groups in one or more process types, can allow business experts with limited software engineering expertise to configure business-specific dialogs. In one or more implementations, having a collection of processes of the same process type may provide a flexible and customizable enterprise software that is well suited to handle new and unexpected business requirements.

Figure 1:
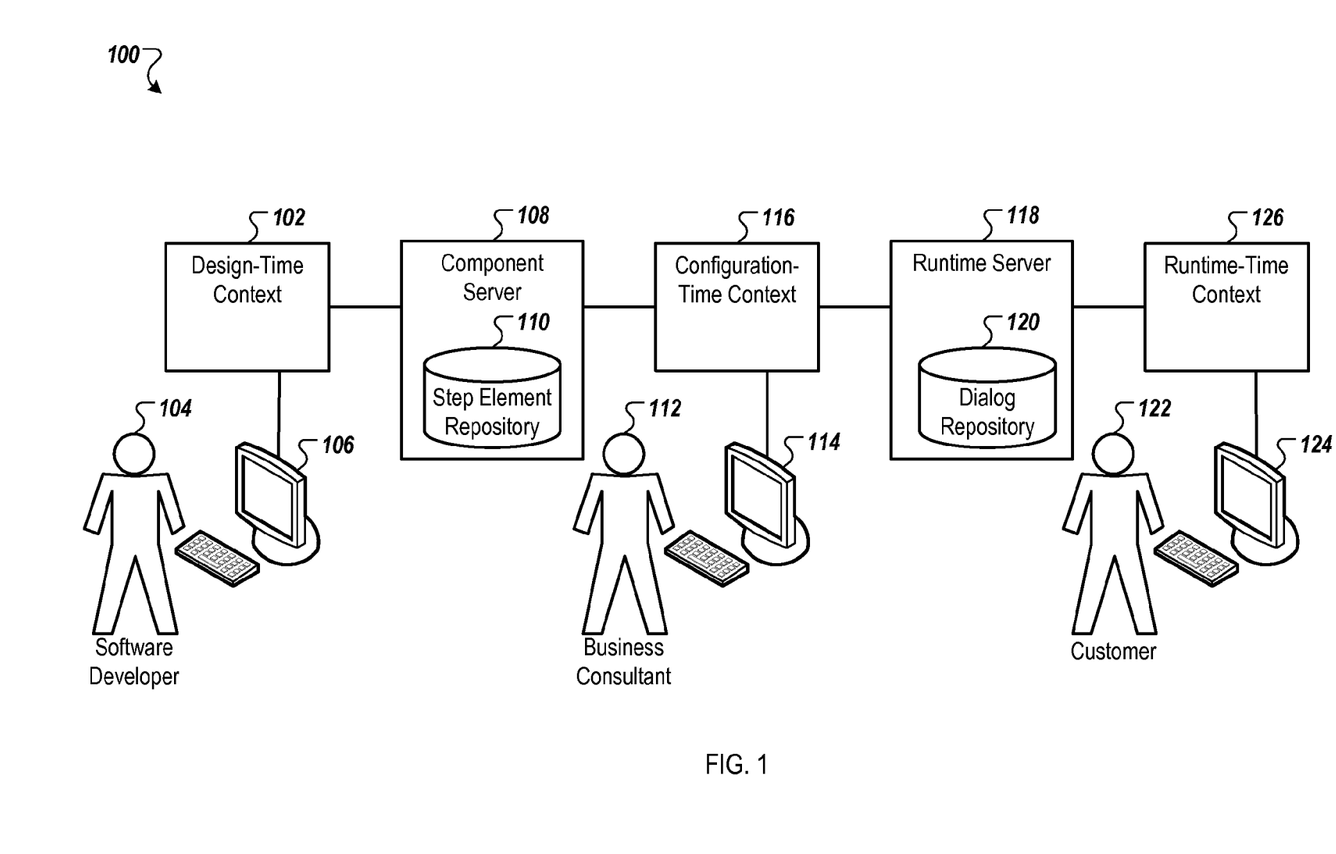
FIG. 1 is a block diagram of an example system for designing, configuring, and running a program.

FIG. 1 is a block diagram of an example system 100 for designing, configuring, and running a program. A design-time context 102 can contain tools for designing software components such as process types, step groups, and step elements of applications. A software developer 104 may interact with a design interface 106 to design the components based on broad business function categories. For example, the business functions can include, but are not limited to, managing or reporting sales transactions; submitting, receiving, or responding to quotes; or troubleshooting hardware or software implementations. The software developer 104 may have a comprehensive understanding of the technical aspects of the components, but may not have the same level of understanding of all of the specific business environments in which the components may be used.

The components can be published on a component server 108 in a step element repository 110. For example, the components can be implemented by creating and storing descriptions using any suitable computer-readable language or code, such as a script or markup code. The components may be available to one or more business consultants 112 in a configuration phase. Using a configuration interface 114, the business consultant 112 can configure the components in the step element repository 110 into a process stored in a configuration-time context 116. In the configuration-time context 116, a process can be created based on a process type. Steps can be defined from the step groups by specifying one or more step elements to be displayed in a step. Multiple related step elements can be included in a single step, for example to collect billing and shipping addresses, or to select from a series of product customization options. The business consultant 112 may have a comprehensive understanding of a business's needs and operating environment, but may not have the same level of understanding of software development techniques as the software developer 104.

The processes can be published on a runtime server 118 in a dialog repository 120. A customer 122, or other type of user such as a sales person or data processor, can use a customer interface 124 to access a process from the dialog repository 120 in a runtime context 126. Processes can have binding information associated with them in the runtime context for selection of a process to execute. The processes may be configured to process events that are similar, but that use different user entered data. For example, a customer may access a shopping cart process dialog in a retail web site runtime context.

In some implementations, multiple processes can be stored in the dialog repository 120 and executed in the runtime context 126 according to binding information. For example, a car salesperson customer may use a quote generating application in the runtime context 126. The customer 122 can select to launch an on-lot quote dialog or a custom-order quote dialog from the dialog repository 120, for example based on if a requested car is found in the current lot inventory.

The design-time context 102 can include one or more computers with tools for software development, testing and documenting. These tools can include integrated development environments, code generation utilities, software test harnesses, and document publishing applications. A version control system in the design-time context 102 can store and monitor changes to the code. A step modeler can analyze business data collected from a dataset of business rules to identify step elements and to model relationships between step elements.

The configuration-time context 116 can include one or more computers with tools for process modeling. The process modeling tools can provide a graphical user interface with controls to create a process from a collection of process types and to create steps from a collection of step elements. The step modeling tools can also assign an overall look-and-feel to a process and graphical elements to a process or step.

The runtime context 126 can include one or more computers with process execution tools to execute or interpret a process and present a process user interface. The process execution tool can determine which steps should start or stop a process, which data need to be available for initialization of a process, and whether a step, step element, or step group is complete, incomplete, or has errors. The process execution tool can also determine the order of steps and in a process and provide navigation controls to move from one step to the next.

The design-time context 102, configuration-time context 116 and runtime context 126 can be used sequentially to create, configure, and execute a process. Step elements and process types can be first created in a design-time context 102. After at least some step elements and process types are created, steps and processes can be configured in the configuration-time context 116. After at least some of the steps and processes are configured, steps and processes can be executed in the runtime context 126.

Figure 2:
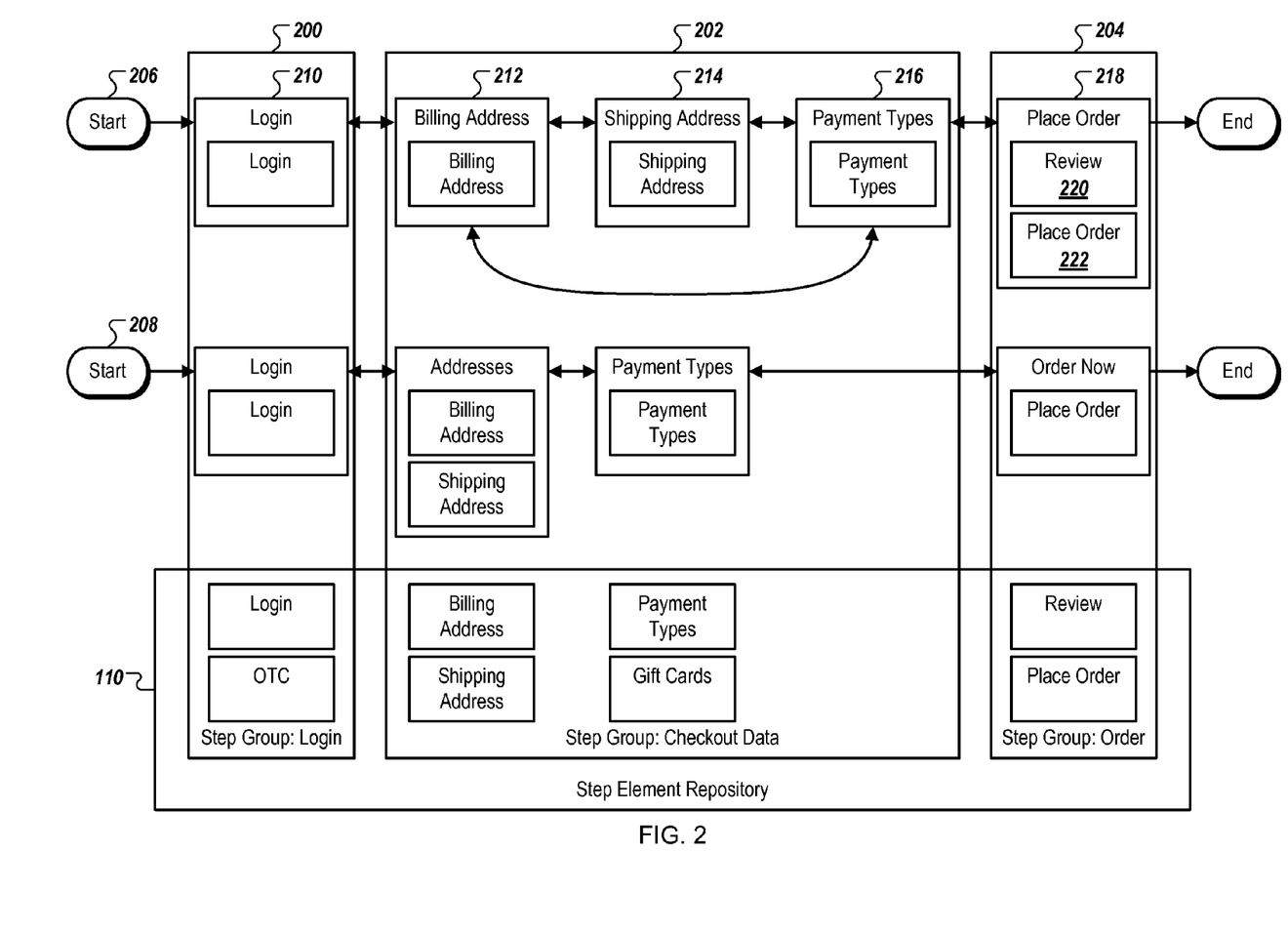
FIG. 2 is a block diagram schematically showing example process configurations

FIG. 2 is a block diagram schematically showing example process configurations. The step element repository 110 can contain step elements organized into step groups and related to a single process type. The process type is a broad category of business processes that may be narrowed to a more specific use case. Similarly, step groups are broad categories of steps that can make up a process type and be more narrowly defined for a more specific use case.

The step elements in the step element repository 110 can be accessed for a variety of different usage types (e.g., online retailers, service businesses, government and/or educational agencies). Some step elements may only be applicable to a subset of those usage types.

The step elements in the step element repository 110 can be related to a sales process type, which is shown in this example. The sale process type can contain any number of step groups. Here, the sale process type includes three step groups: a login step group 200, a checkout data step group 202, and an order step group 204. Step groups can specify the type of information that must be received by step elements in that step group, for example before a process can move to the next step group. Step elements may have one or more prerequisites, for example information to be gathered or step elements to be included in previous steps or in the same step that contains that step element. A process type can have a many-to-many relationship with step groups. For example, a process type can have multiple step groups and one particular step group can be used in multiple process types. Step groups can have a many-to-many relationship with step elements. For example a step group can have multiple step elements and one particular step element can be used in multiple step groups.

Accordingly, the step groups 200-204 here define the process type and are stored in the step element repository 110 such that they are available for development and design purposes. For example, each step group can represent a logical portion of the dialog process, where the system will perform data validity, consistency and/or completeness checking for that portion at the end of the step group. That is, the process can be configured so that it continues performing tasks within the same step group regardless of whether the received data is valid, consistent and/or complete (or without checking the data for those qualities). However, at the end of the step group, the process may not be allowed to proceed with any step in the next step group until all quality checks for the current step group have been successfully performed.

In some implementations, to later configure a specific process based on the step elements and the step groups, one or more steps can be created in each step group. The step elements can then be assigned to the individual steps in a way that fits the purposes and characteristics of the business and its intended customers.

For example, a process 206 and a process 208 are later created from the sales process type. Particularly, each of the processes is created by specifying steps within the step groups 200-204, thereby defining a granularity of the process, wherein one or more of the step elements is assigned to each of the steps. Here, the process 206 includes one login step 210, three checkout data steps 212-216, and one order step 218. The arrows in the process schematically indicate data passage and fulfillment of one or more step element requirements. For example, the payment types step 218 uses data or information from at least the billing address step 214 and the shipping address step 216.

Some steps, such as the step 218, can contain two or more step elements, in this case a review step element 220 and a place order step element 222. When the process 206 is executed, these two step elements can be displayed to the user at the same time.

As shown, the process 206 and the process 208 have a different number and order of steps. Both process 206 and 208 gather similar data from a user by the final step in each step group: login information for the login step group 200, address and payment information for the checkout data step group 202, and order confirmation for the order step group 204. However, one difference between them is that the creator of the process 208 chose not to include the review step 222.

As another example, the process 208 was created so that the step elements Billing Address and Shipping Address are included in a common step called Addresses, as opposed to in the process 206, where they are in the separate steps 212 and 214. This illustrates the flexibility in being able to create processes of different granularity from a common process type. The configuration process is also flexible yet reliable due to the ability to assemble step elements in more than one order within the step group.

The step elements Billing Address and Shipping Address were here always included in the same step group (the checkout data step group 202). Therefore, the person creating the process 208 would know that placing the step elements in a particular order, or having them coincide in a single step, would not lead to inconsistencies or contradictions vis-à-vis the underlying logic, data model or quality checking. However, the creator would have been discouraged from trying to blend step elements from different step groups into a single step (whether those step groups were adjacent to each other or not), because the step groups define boundaries for rearranging and combining individual step elements.

Different processes of the same process type may be used for similar tasks in a business. For example, the process 206 can be used to order general merchandise from a retail business, and the process 208 can be used to order controlled products (e.g., chemicals, medical equipment, etc.) which may only be shipped to the same address as the billing address. During runtime, a process can be selected based on binding information collected from the runtime context, for example the contents of a customer's shopping cart. In some implementations, the binding information for each process can be ordered by a priority number, and the binding information can be examined in order of the priority number until an appropriate process is discovered.

Figure 3:
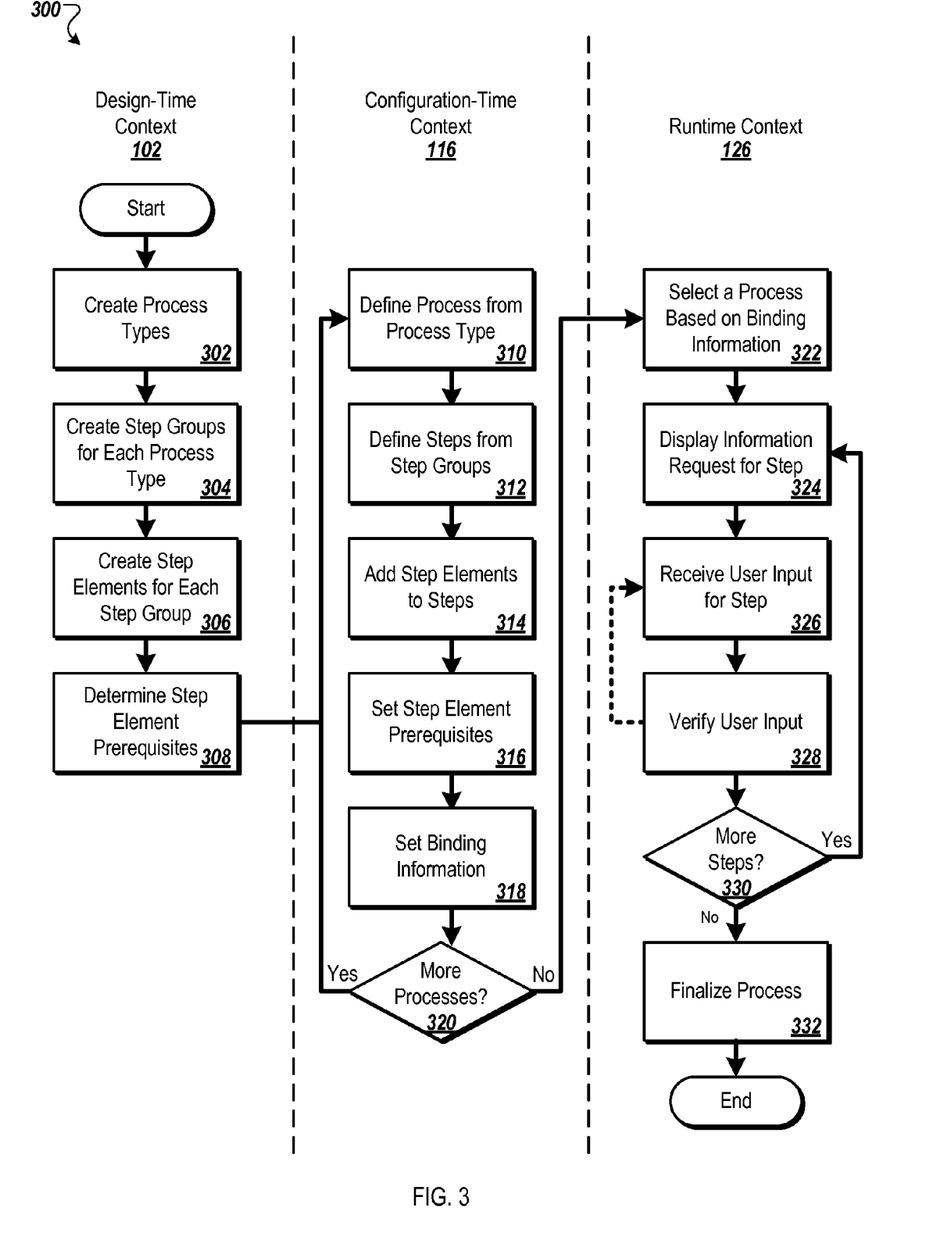
FIG. 3 is a swimlane diagram of an example procedure for configuring, and running a program

FIG. 3 is a swimlane diagram of an example procedure 300 for designing, configuring, and running a program. The procedure 300 can be performed, for example, by the design-time context 102, the configuration-time context 116 and the runtime context 126. The procedure 300 can be implemented in a computer program product stored in a computer-readable storage medium. The procedure 300 can be used to design a process type generally applicable for a range of uses, configure processes applicable for a specific use, and to execute one of the processes to perform an action.

Process types are created (302) in a design-time context, for example in the design-time context 102. The process types can include a broad categorization of actions that can be repeatedly performed by a business, business user, or business customer. For each process type, step groups are created (304). The step groups can broadly define the kind of information that is to be requested from a user interacting with a process of the process type. For each step group, one or more step elements are created (306). The step elements can be executable modules of code with well-defined inputs, outputs, and behaviors. The inputs for step elements can be supplied by user interaction and/or by output from other step elements. Step element prerequisites can be defined (308) for some or all of these step element inputs. Some of the step element prerequisites may be designed with a flag that can be set to either optional or mandatory.

A process is defined, in a configuration-time context, from a process type (310). For example, the process can be defined in the configuration-time context 116. The process can be given a name and/or description for the type of business action with which it is associated. Steps are defined for the process (312) from the step groups and step elements of the process type. For example, a business consultant can organize an existing business activity performed manually into a sequence of steps, or a new business activity can be planned as a series of steps. These steps can be defined in the process to mimic the existing manual process or to implement the new process.

Step elements are added to the steps (314). These step elements can be organized such that associated step element prerequisites are fulfilled before or during the presentation of a step element, and optional step elements prerequisites can be flagged as either required or optional (316). In some implementations, data for optional step element prerequisites can be displayed as optional forms in a user interface which may be left blank by a user (e.g., optional demographic information that is unneeded for the process, but which may have business value). In some implementations, optional step element prerequisites can be unfulfilled in the process (e.g., shipping address for sale of digital content that is delivered electronically via a computer network). Binding information for the process is set (318). The binding information can include a Boolean statement or executable code indicating that a process should be used in a given situation. Additional processes may be created (320) and can be added to a collection of processes.

A process is selected based on binding information (322) in a runtime context, for example in the runtime context 126. The state of one or more variables of a runtime context can be compared to binding information of a collection of processes, and a process can be selected. For each step (330) in the selected process, a request for information is presented to a user (324), user input is received (326), and the user input is verified (328). If the user input is not verified (e.g., wrong type of information, required information not provided, information determined to be false or impossible, etc.), the process can halt until correct user input is received (326). The process can finalize (332), including, but not limited to, generating a report or message, saving information to a recordable medium, and/or bringing a user to a new user interface screen in a runtime context.

Figure 4:
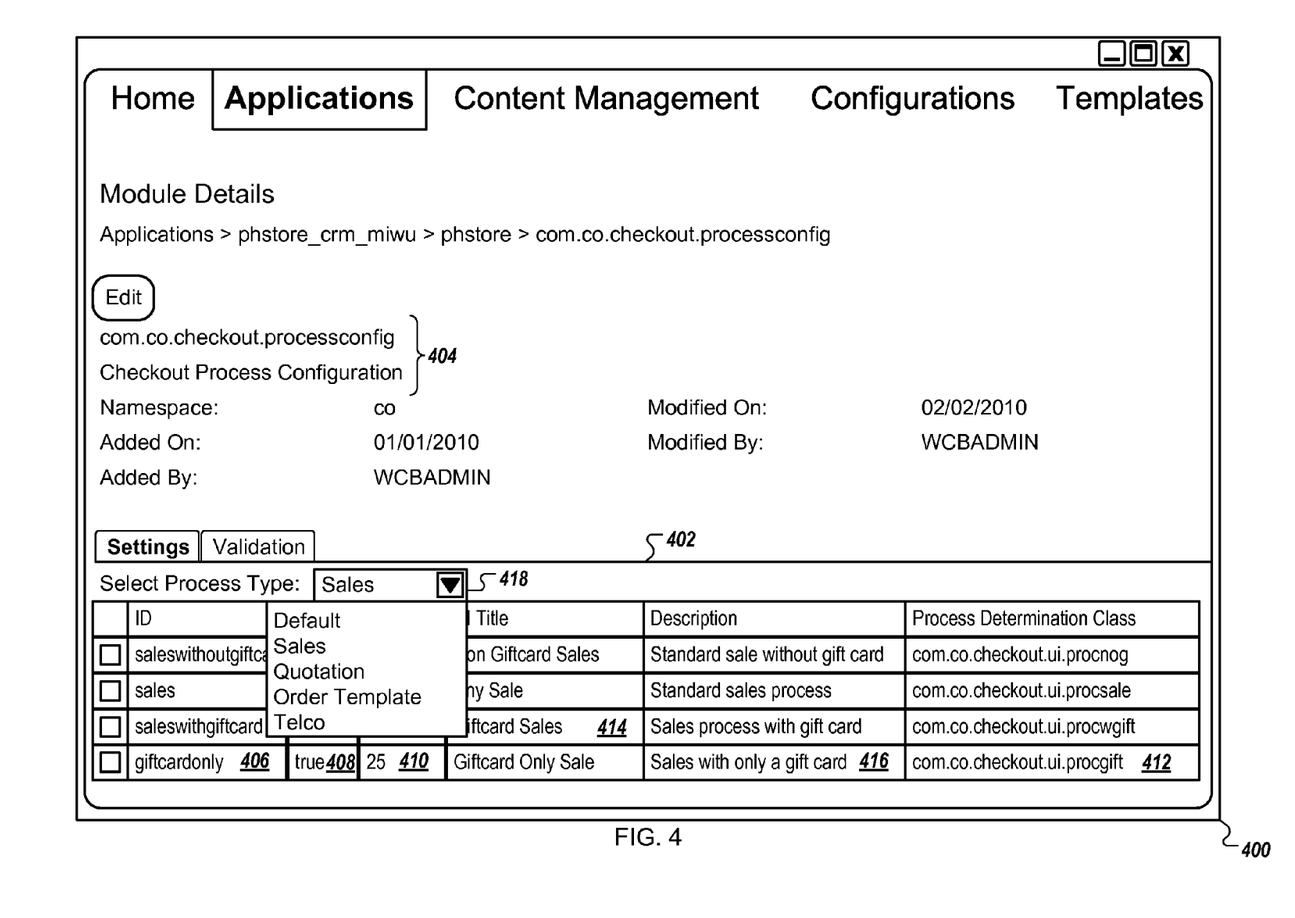
FIGS. 4-6 are example graphical user interfaces for use in designing, configuring, and running a program.
Figure 5:
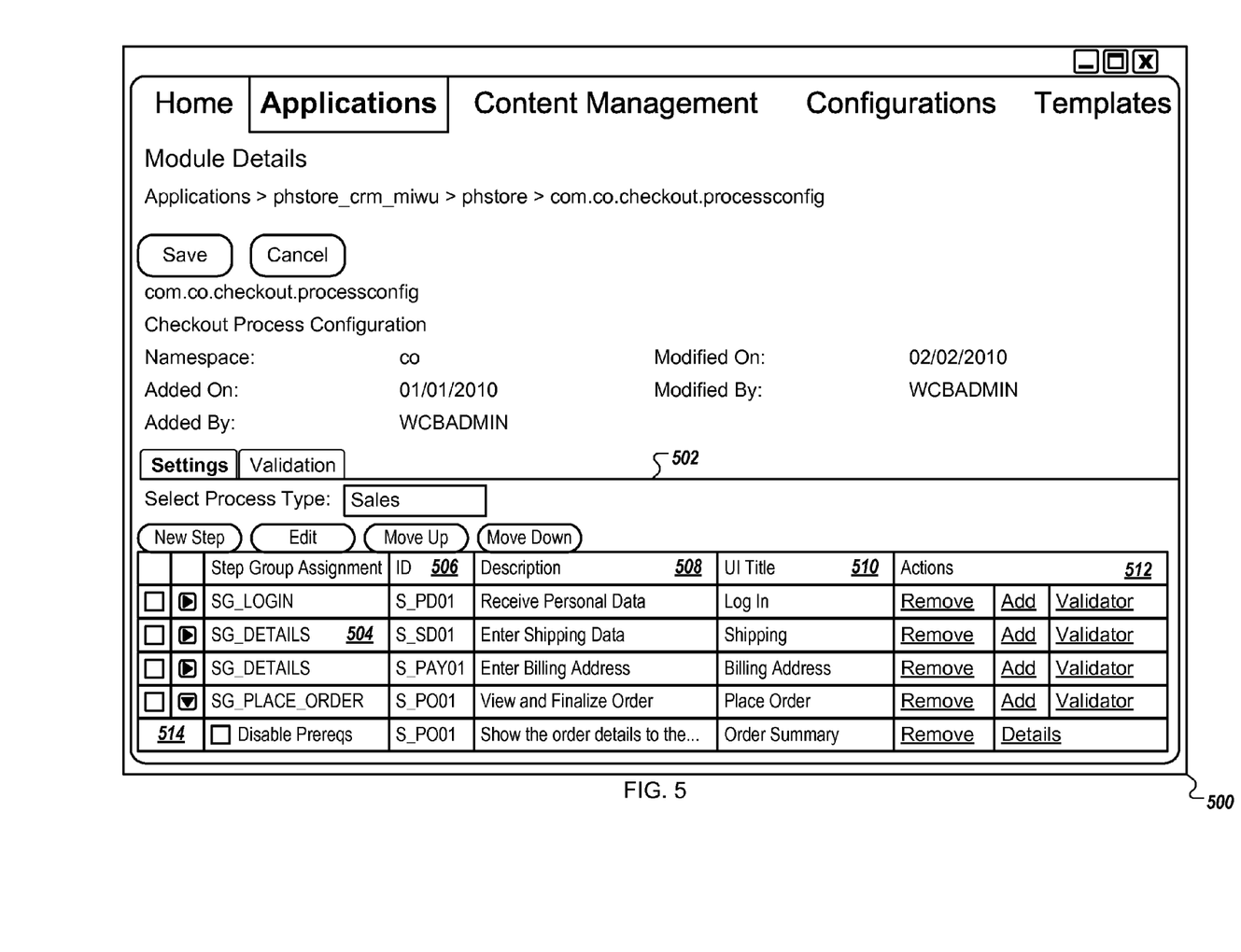
Figure 6:
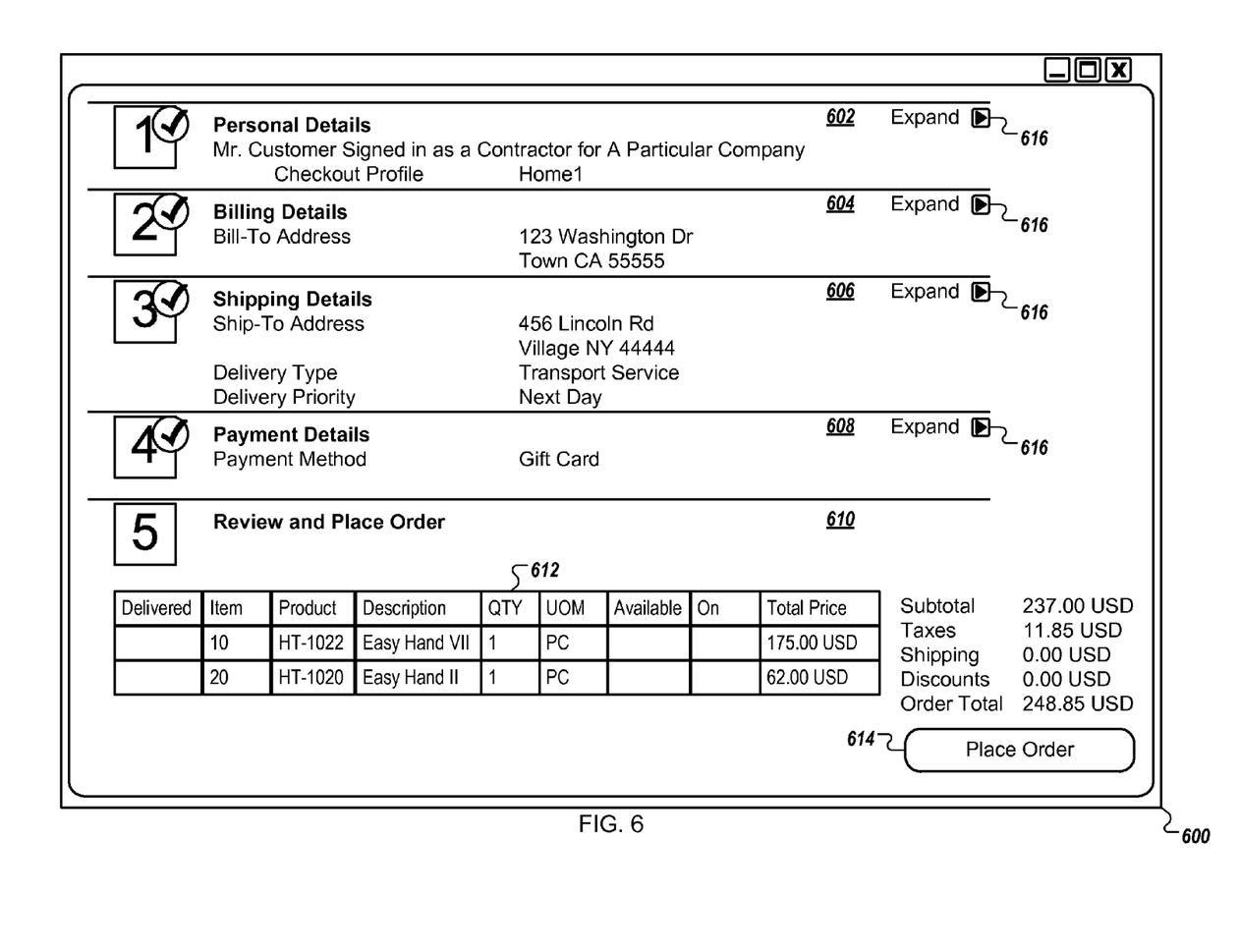

FIGS. 4-6 are example graphical user interfaces for use in configuring and running a program. In some implementations, the graphical user interfaces according to FIGS. 4 and 5 can be included in the configuration interface 114, and the graphical user interface according to FIG. 6 can be included in the customer interface 124.

FIG. 4 is an example graphical user interface 400 for use in configuration of a process from a process type. The graphical user interface 400 can be used to create a collection of processes in a process group, for example related to the checkout function of a retailer that supports gift cards. Each row of a process table 402 can display an existing process in a process group 404. For example, the process group 404, labeled "Checkout Process Configuration," can contain processes related to retail checkout transactions. A user, such as a business consultant, can create a process group to contain one or more processes that are related from a business perspective. The processes in a process group may be of one or more process types.

In a column 406, labeled "ID", a user can specify an identification string for each process. The identification strings can be unique for the process group 404 and used to reference the processes. In some implementations, the identification string can be an automatically generated unique number, a hex value, or other data.

In a column 408, labeled "Enabled", a user can specify an enabled or disabled state for each process. Disabled processes may be unusable in a runtime context, but reserved for future use. For example, a process created for a recurring promotional discount can be normally disabled, and enabled for the duration of the recurring discount period.

In a column 410, labeled "Priority", a user can specify a priority number for each process. The priority number can define the order in which a process determination class is executed to determine if the associated process is applicable for a particular runtime context state.

In a in a column 412, labeled "Process Determination Class", a user can specify a process determination class for each process. In some implementations, the process determination class can be selected from a list of available classes presented to a user. The process determination classes can be created by a software developer and/or a business consultant.

In a column 414, labeled "Title", a user can specify a title for each process, and in a column 416, labeled "Description", a user can specify a description for each process. These titles and descriptions may be used to provide context for a process otherwise identified by an identification string.

A dropdown menu 418 can display a list of available process types. Upon selection of a process type, a new process can be loaded into the process table 402 with blank or default information. Different process types may be included in a single process group 404. For example, a retailer can present a sales type process dialog or a quote type process dialog from the same runtime user interface screen, depending on the type of product currently displayed.

FIG. 5 is an example graphical user interface 500 for use in defining steps in a process and adding step elements to the steps. The graphical user interface 500 can be used to create a collection of steps for a process, for example from the step groups of a process type. Each row of a process table 502 can display an existing step for the process, or nested step elements for a step. As shown in the process table 502, four steps have been defined. One step has been expanded to show an associated step element.

In a column 504, labeled "Step Group Assignment", a user can specify the step group to which each step is a member. The step group assignment can be selected from a list of available classes presented to a user. As shown, multiple steps may be created with the same step group assignment.

In a column 506, labeled "ID", a user can specify an identification string for each step. The identification strings can be unique for the process displayed and used to reference the step. In some implementations, the identification string can be an automatically generated unique number, a hex value, or other data.

In a column 508, labeled "Description", a user can specify a description for each step, and in a column 510, labeled "UI Title" a user can specify a description for each step. The description and UI titles may be used in a runtime presentation of a step and/or step element to guide a user.

In a column 512, labeled "Actions", links to computer controlled commands associated with a step are displayed. A "Remove" link can remove the step, and any associated step elements, from the process. An "Add" link can launch a dialog from which a user may select a valid step element to be added to the step. A "Validator" link can launch a dialog from which a user may select a validator class. In some implementations, each step element must have a validator class assigned. The validator class can ensure correct data for the step element within a process. A validator can handle an error, for example from invalid or incorrect user-entered data. A process runtime can halt until the validator error handling is complete, for example upon receiving valid user-entered data. Validator logic can be defined by rule-based logic, for example as defined by a business consultant, or by code-based logic, for example as defined by a software developer.

Step elements associated with a step can be displayed nested in one or more rows under a step, as in row 514. By activating a "Disable Prerequisites" checkbox, a user can specify that any optional prerequisites for that step element may be ignored or optional. A "Details" link in the column 512 can show the details associated with an element, including associated inputs, outputs, behavior, and prerequisites of the step element.

FIG. 6 is an example graphical user interface 600 for displaying a runtime dialog of a process. The graphical user interface 600 may be presented, for example, to a customer checkout out in a retail runtime context.

In the example shown, a user has entered data and moved through steps 602-608, and is shown the step 610. Step elements 612 and 614 are shown in the step 610. Each step 602-610 includes a data entry field. In the steps 602-608, text entry fields are presented to a user. After entering data, a user may press a "Next" button to move on to the next step. In response, the entered data may be verified and, if correct, the next step can be displayed to a user. If the data cannot be verified, a pop-up dialog can alert the user to the error. In the step 610, a user can review the order details and press the "Place Order" button in the step element 614 to finalize the order.

A button 616 labeled "Expand", upon activation, can display the data entry fields for the associated step. The user may review and/or edit that data before returning to the current step.

Figure 7:
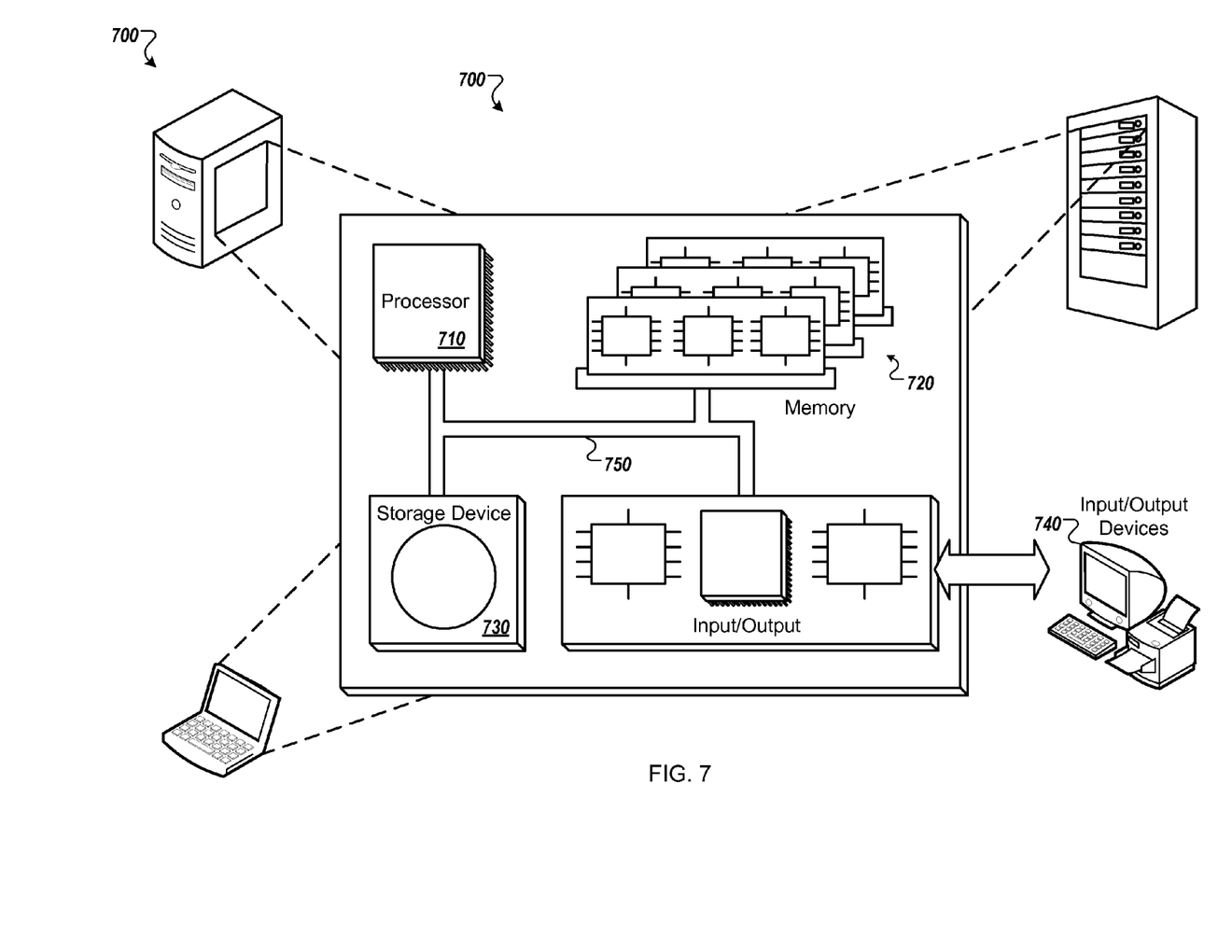
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing context.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, the method comprising:
    displaying, by a computing system, a first graphical user interface that includes multiple first graphical user interface elements that identify multiple respective process types, and with which user input indicating a selection of one of the multiple process types is able to be elicited, wherein each process type is associated with a business function;
    receiving, by the computing system, first user input that selects a particular one of the multiple first graphical user interface elements that is associated with a particular one of the multiple process types;
    identifying, by the computing system and as a result of having received the first user input that selects the particular one of the multiple first graphical user interface elements, one or more step groups that are associated with the particular one of the multiple process types, wherein each of the identified one or more step groups defines a specific type of graphical user interface for eliciting user input during an information collection process, wherein the computing system has stored different sets of one or more step groups in association with other of the multiple process types;
    displaying, by the computing system and as a result of having received the first user input, one or more second graphical user interface elements that identify the identified one or more step groups that are associated with the particular one of the multiple process types;
    receiving, by the computing system, second user input that selects a particular one of the one or more second graphical user interface elements, wherein the selected particular one of the one or more second graphical user interface elements identifies a particular one of the one or more step groups;
    identifying, by the computing system and as a result of having received the second user input that selects the particular one of the one or more second graphical user interface elements, one or more step elements that are associated with the particular one of the one or more step groups, wherein each of the identified one or more step elements identifies information to include in a graphical user interface of the specific type of graphical user interface defined by the particular one of the one or more step groups;
    displaying, by the computing system and as a result of having received the second user input, one or more third graphical user interface elements that identify the one or more step elements that are associated with the particular one of the one or more step groups;
    receiving, by the computing system, third user input that selects one or more of the one or more third graphical user interface elements, wherein the selected one or more of the one or more third graphical user interface elements identifies a particular one of the one or more step elements that are associated with the particular one of the one or more step groups; and
    generating, by the computing system and as a result of having received the first user input, the second user input, and the third user input:
        a first process step configured to display first information identified by the particular one of the one or more step elements to include in a second graphical user interface that is of the specific type of graphical user interface defined by the particular one of the one or more step groups, and
        a first process of the selected particular one of the multiple process types for eliciting user input, wherein the first process includes the first process step and is configured to display, during a runtime execution of the first process, the second graphical user interface that is of the specific type of graphical user interface defined by the particular one of the one or more step groups, the second graphical user interface including the first information.

2. The method of claim 1, further comprising:
    identifying, by the computing system, a first priority number associated with a second process, the second process having a first process type of the multiple process types and including a second process step configured to display second information identified by a first step element to include in a third graphical user interface that is of a second specific type of graphical user interface defined by a first step group;
    identifying, by the computing system, a second priority number associated with a third process, the third process having a second process type of the multiple process types and including a third process step configured to display third information identified by a second step element to include in a fourth graphical user interface that is of a third specific type of graphical user interface defined by a second step group;
    selecting, by the computing system and during the runtime execution of the first process, one of the second and third processes for execution based on the first and second priority numbers.

3. The method of claim 2, wherein the selected one of the second and third processes is executed after completion of the runtime execution of the first process.

4. The method of claim 2, wherein the selected one of the second and third processes is executed while the runtime execution of the first process is in progress.

5. The method of claim 2, wherein the selecting of the one of the second and third processes is performed in response to fourth user input received by the computing system in response to information being displayed as part of the first graphical user interface.

6. The method of claim 1, further comprising:
receiving, by the computing system, fourth user input indicating a selection of a disable indicator associated with the first process; and
displaying, by the computing system and in response to the fourth user input, one or more fourth graphical user interface elements indicating that the first process is in a disabled state.

7. The method of claim 1, wherein the particular one of the one or more step elements is associated with a first step element prerequisite that must be satisfied prior to execution of the first process step within the runtime execution of the first process.

8. The method of claim 1, further comprising:
displaying, by the computing system:
a graphical indication of the first process, the graphical indication of the first process having one or more selectable elements,
a graphical indication of a second process, the second process having a first process type of the multiple process types and including a second process step configured to display second information identified by a first step element to include in a third graphical user interface that is of a second specific type of graphical user interface defined by a first step group, and the graphical indication of the second process having one or more selectable elements, and
a graphical indication of a third process, the third process having a second process type of the multiple process types and including a third process step configured to display third information identified by a second step element to include in a fourth graphical user interface that is of a third specific type of graphical user interface defined by a second step group, and the graphical indication of the third process having one or more selectable elements.

9. One or more non-transitory computer-readable medium including instructions that, when executed by one or more processors, cause performance of operations, the operations comprising:
displaying, by a computing system, a first graphical user interface that includes multiple first graphical user interface elements that identify multiple respective process types, and with which user input indicating a selection of one of the multiple process types is able to be elicited, wherein each process type is associated with a business function;
receiving, by the computing system, first user input that selects a particular one of the multiple first graphical user interface elements that is associated with a particular one of the multiple process types;
identifying, by the computing system and as a result of having received the first user input that selects the particular one of the multiple first graphical user interface elements, one or more step groups that are associated with the particular one of the multiple process types, wherein each of the identified one or more step groups defines a specific type of graphical user interface for eliciting user input during an information collection process, wherein the computing system has stored different sets of one or more step groups in association with other of the multiple process types;
displaying, by the computing system and as a result of having received the first user input, one or more second graphical user interface elements that identify the identified one or more step groups that are associated with the particular one of the multiple process types;
receiving, by the computing system, second user input that selects a particular one of the one or more second graphical user interface elements, wherein the selected particular one of the one or more second graphical user interface elements identifies a particular one of the one or more step groups;
identifying, by the computing system and as a result of having received the second user input that selects the particular one of the one or more second graphical user interface elements, one or more step elements that are associated with the particular one of the one or more step groups, wherein each of the identified one or more step elements identifies information to include in a graphical user interface of the specific type of graphical user interface defined by the particular one of the one or more step groups;
displaying, by the computing system and as a result of having received the second user input, one or more third graphical user interface elements that identify the one or more step elements that are associated with the particular one of the one or more step groups;
receiving, by the computing system, third user input that selects one or more of the one or more third graphical user interface elements, wherein the selected one or more of the one or more third graphical user interface elements identifies a particular one of the one or more step elements that are associated with the particular one of the one or more step groups; and
generating, by the computing system and as a result of having received the first user input, the second user input, and the third user input:
a first process step configured to display first information identified by the particular one of the one or more step elements to include in a second graphical user interface that is of the specific type of graphical user interface defined by the particular one of the one or more step groups, and
a first process of the selected particular one of the multiple process types for eliciting user input, wherein the first process includes the first process step and is configured to display, during a runtime execution of the first process, the second graphical user interface that is of the specific type of graphical user interface defined by the particular one of the one or more step groups, the second graphical user interface including the first information.

10. The computer-readable medium of claim 9, wherein the operations further comprise:
identifying, by the computing system, a first priority number associated with a second process, the second process having a first process type of the multiple process types and including a second process step configured to display second information identified by a first step element to include in a third graphical user interface that is of a second specific type of graphical user interface defined by a first step group;
identifying, by the computing system, a second priority number associated with a third process, the third process having a second process type of the multiple process types and including a third process step configured to display third information identified by a second step element to include in a fourth graphical user interface that is of a third specific type of graphical user interface defined by a second step group;
selecting, by the computing system and during the runtime execution of the first process, one of the second and third processes for execution based on the first and second priority numbers.

11. The computer-readable medium of claim 10, wherein the selected one of the second and third processes is executed after completion of the runtime execution of the first process.

12. The computer-readable medium of claim 10, wherein the selected one of the second and third processes is executed while the runtime execution of the first process is in progress.

13. The computer-readable medium of claim 10, wherein the selecting of the one of the second and third processes is performed in response to fourth user input received by the computing system in response to information being displayed as part of the first graphical user interface.

14. The computer-readable medium of claim 9, wherein the operations further comprise:
receiving, by the computing system, fourth user input indicating a selection of a disable indicator associated with the first process; and
displaying, by the computing system and in response to the fourth user input, one or more fourth graphical user interface elements indicating that the first process is in a disabled state.

15. The computer-readable medium of claim 9, wherein the particular one of the one or more step elements is associated with a first step element prerequisite that must be satisfied prior to execution of the first process step within the runtime execution of the first process.

16. The computer-readable medium of claim 9, wherein the operations further comprise:
displaying, by the computing system:
a graphical indication of the first process, the graphical indication of the first process having one or more selectable elements,
a graphical indication of a second process, the second process having a first process type of the multiple process types and including a second process step configured to display second information identified by a first step element to include in a third graphical user interface that is of a second specific type of graphical user interface defined by a first step group, and the graphical indication of the second process having one or more selectable elements, and
a graphical indication of a third process, the third process having a second process type of the multiple process types and including a third process step configured to display third information identified by a second step element to include in a fourth graphical user interface that is of a third specific type of graphical user interface defined by a second step group, and the graphical indication of the second process having one or more selectable elements.

* * * * *